A. WRIGHT.
ROD PACKING.
APPLICATION FILED APR. 16, 1919.
1,417,877.
Patented May 30, 1922.
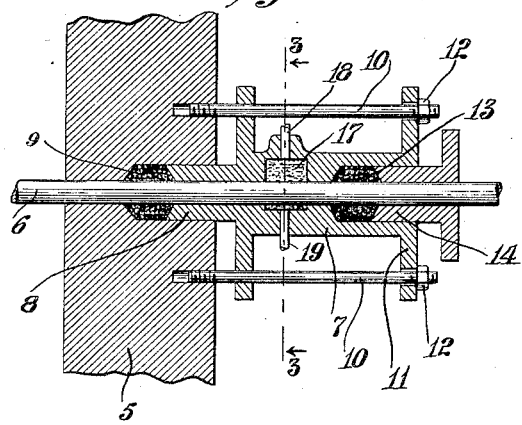
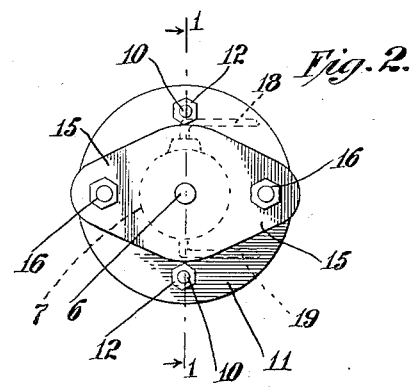
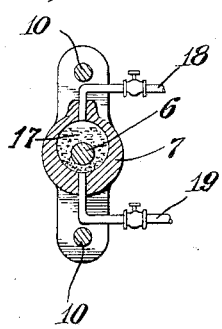
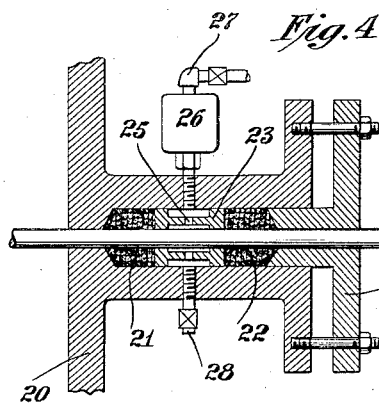
WITNESS:
INVENTOR
Arthur Wright
BY Ralph N. Flint
ATTORNEY

UNITED STATES PATENT OFFICE.

ARTHUR WRIGHT, OF MONTCLAIR, NEW JERSEY.

ROD PACKING.

1,417,877. Specification of Letters Patent. Patented May 30, 1922.

Application filed April 16, 1919. Serial No. 290,563.

*To all whom it may concern:*

Be it known that I, ARTHUR WRIGHT, a citizen of the United States, and a resident of Montclair, in the county of Essex and State of New Jersey, have invented certain new and useful Improvements in Rod Packings, of which the following is a full, clear, concise, and exact description, such as will enable others skilled in the art to which the invention relates to make and use the same, reference being made therein to the accompanying drawing, which forms a part of this specification.

My invention relates to rod packing designed for use with pumps, engines, etc., and in fact in any device wherein the flow of a fluid along a reciprocating or rotating shaft or rod is to be prevented; and the object thereof is to provide rod packing wherein should a leak develop the flow of fluid along the shaft or rod will be quickly arrested, the packing being self sealing in character so that such incipient leaks as might otherwise develop to an objectionable degree are sealed before they have an opportunity to develop to any substantial extent.

A further object of my invention to provide a self sealing rod packing in which the flow of fluid along the rod due to a leak at the stuffing-box through which the rod extends is automatically arrested, and the leak stopped, as above explained; and in which the device whereby that end is attained acts also to lubricate the rod or shaft, so that the packing is both self sealing and lubricating in character.

With the above and other objects of invention in view, my invention consists in the improved rod packing illustrated in the accompanying drawing, described in the following specification, and particularly claimed in the concluding claims, and in such variations and modifications thereof as will be obvious to those skilled in the art to which my invention relates.

In the drawing accompanying and forming a part of this specification and wherein the preferred embodiment of my invention is illustrated:

Figure 1 is a view showing a section of my invention taken upon a vertical longitudinally extending plane indicated by the line 1—1, Figure 2;

Figure 2 is a view showing the same in elevation and as seen from a position to the right of Figure 1;

Figure 3 is a view showing a section taken upon a vertical transverse plane indicated by the line 3—3, Figure 1; and, Figure 4 is a view showing a section upon a vertical longitudinally extending plane, of a modified form of my invention.

Referring now to the drawing, the reference numeral 5 designates a portion of the end or other wall of an engine, pump, compressor or other device; and 6 designates a reciprocating, rotating or other rod to be packed, and along which a flow of fluid is to be prevented by the use of my improved rod packing.

The reference numeral 7, Figure 1, designates a follower the inner end 8 of which enters a recess provided in the wall 5 and bears against a packing 9 located within said recess; said follower being adjustable as by means of rods 10 carried by the wall and extending through a flange 11 at the outer end of the follower and there provided with nuts 12, to thereby provide for the compressing of the packing about the rod. The recess, the follower, and the packing thus provide a stuffing box for the rod; and the packing is shown as fibrous in character, such as may be provided by the use of asbestos or similar packing material.

A second stuffing box is provided at the outer end of the follower 7 and within which a second packing 13, also of a fibrous nature or material, is located; a second follower having an extension 14 engaging said packing, and ears 15 through which bolts 16 extend being also provided for compressing the said packing to thereby tighten the same; the inner ends of said bolts being secured in threaded holes in the flange 11 of the follower 7 in the embodiment of my invention illustrated.

Located between the stuffing boxes above referred to and between the packings 9 and 13 therein, and formed, preferably, within the follower 7, is a chamber 17 which contains a liquid in which a finely divided solid material is held in suspension; the liquid being preferably one having lubricating qualities, such as oil, and the solid material being preferably graphite which also has lubricating qualities. This chamber is kept full of liquid by means of pipes 18, 19, although there is no flow of liquid through the chamber; two pipes being shown as used in order to better facilitate the filling of the chamber without the trapping of air therein, and the supply of liquid to the chamber to keep it full and free from air when the device is in use. The liquid within the chamber is confined therein so that it cannot escape therefrom if or when subjected to pressure, as to the pressure within the pump or other device the rod of which is to be packed, as by means of valves in the pipes 18, 19 or by subjecting the same to a pressure equal to or slightly in excess of the pressure to be packed against and which obviously tends to produce a flow of fluid along the rod; so that the liquid can escape from the chamber 17 which contains it only by flowing along the rod packed from a region of higher toward a region of lower pressure. The chamber is preferably eccentric to the rod, as best shown in Figure 3, so that when the device is at rest for a time if the solid material settles it will settle around the rod, and will be quickly stirred up and re-distributed throughout the liquid when the rod resumes its movement.

Assuming that the device having the wall 5 is one within which the pressure is above atmospheric pressure; then the tendency of such pressure is obviously to produce a flow of the fluid thus under pressure (steam, gas, a liquid, or whatever fluid may be within the device having the wall 5) along the rod 6 toward a region of lower pressure.

The inner stuffing box and packing material 9 therein performs the function ordinarily performed by stuffing boxes and packings, and acts more or less effectively to prevent a flow along the rod, because of its tightness; and such packing, so far as concerns an outward flow along the rod, may be any kind of a packing, although as hereinbefore stated it is preferably a fibrous packing or packing material.

The fluid leaking along the rod 6 must of necessity force the liquid from the chamber 17 before it and along the rod, as the liquid within said chamber has no other path of flow or egress; thus forcing liquid and solid material held in suspension therein outward from the chamber 17 into the outer stuffing box within which the packing material 13 is contained. This last mentioned packing material in order to arrest an outward flow of liquid must be of a fibrous nature, or of a character such that it will arrest the passage of the solid material carried by the liquid coming from the chamber 17 in a manner analogous to that in which the filtering medium of a filter arrests and holds solid particles held in suspension in a liquid being filtered; from which it follows that such liquid as passes from the chamber 17 past the packing material 13 leaves the solid material which it held in suspension within the mass or substance of the said packing material.

The filtering out of the solid material by the packing material 13 rapidly fills and clogs the same, and arrests a further flow of liquid from the chamber 17, thus stopping the flow of fluid and preventing leakage along the rod; the packing being self sealing because of the rapidly increasing resistance to outward flow due to the clogging of the pores of the fibrous packing by the solid material strained out from the liquid passing from the chamber 17, and retained by and held by the mass of the said packing.

It, therefore, follows that the rod packing wherein my invention consists remains in a permanently tight condition, as incipient leakage is continually arrested by the sealing action of such solid material as may reach the packing 13 in the manner hereinbefore explained.

It will be appreciated that if the pressure within the device having the wall 5 is below atmospheric pressure, so that leakage will tend to take place along the rod toward the left, then the packing which must of necessity be of a nature such as to strain out the solid material from the liquid passing from the chamber 17 is the inner packing 9; the distinguishing feature of the invention, so far as the relative arrangements of the parts thereof is concerned, being that there shall be a liquid containing chamber located between a region of higher pressure and a mass of fibrous or equivalent packing material beyond which there is a region of lower pressure; so that such leakage as may occur from the region of high pressure will tend to force said liquid along the rod and toward said packing material.

The chamber 17 may be a simple closed chamber full of liquid so that any flow thereinto due to leakage along the rod will be accompanied by a corresponding flow therefrom; or the liquid within said chamber may be under pressure sufficient, were it not for the sealing action of the solid material held in suspension therein, to induce a flow from the chamber along the rod. In this last mentioned case both the packings 9 and 13 should be of such a material as to prevent the flow of the liquid from the chamber in the manner hereinbefore explained; and such should also obviously be the case if the pressure within the device with which the packing is used is sometimes above and at other times below atmospheric pressure.

In the modified form of my invention illustrated in Figure 4 the wall 20 of the device with which the packing is used is provided with a stuffing box having two packings 21 and 22 separated by a lantern or equivalent separating member 23 having a peripheral groove communicating with an internal recess surrounding the rod 24 though holes 25; the liquid which has the solid material held in suspension being supplied to the rod from a reservoir 26 communicating with the holes 25, and suitable pipes 27, 28 being provided to facilitate the complete filling of the space occupied by the liquid, the same as in the form of my invention hereinbefore described. The packings 21, 22 may be compressed to tighten them by a follower 29, and the characteristic features of these last mentioned packings are the same as those of the packings 9 and 13 hereinbefore referred to.

In referring to the chamber 17 as a chamber which is full of liquid I intend to bring out the operation inherent in my invention, and which takes place under such precise conditions, rather than to convey the idea that the chamber must of necessity be full of liquid in order that the device shall operate in the manner contemplated; as it is obvious that in the practical use of my invention some air or gas may be trapped in the chamber in filling the same or in supplying liquid thereto to compensate for such liquid as may be forced therefrom, and gas may reach the chamber by leakage thereinto along the rod. The only outlet from the chamber, however, is along the rod toward the fibrous packing material as hereinbefore explained and, if a compressible gas is in fact present in the chamber, leakage thereinto will build up a pressure therein corresponding with the pressure packed against and which causes such leakage, after which the liquid will be forced from the chamber along the rod and into the fibrous or equivalent packing material; so that the presence of a compressible gas within the chamber in question in no way interferes with the operation of the device in the manner hereinbefore explained.

Having thus described and explained my invention, I claim and desire to secure by Letters Patent:

1. In an apparatus of the class described, a stuffing box containing packing material and through which the rod to be packed extends, a chamber through which said rod passes and located to the rear of said stuffing box, and a liquid containing solids in suspension in said chamber for the purpose set forth.

2. In an apparatus of the class described, including a rod to be packed against leakage, a stuffing box having separated packings therein, with a chamber located therebetween, and a liquid or fluid containing solids of suspension in said chamber for the purpose set forth.

3. An apparatus of the class described including a rod to be packed against leakage, a stuffing box having packing therein, a chamber to the rear of said packing and receiving said rod therethrough, the rod extending adjacent the bottom wall of said chamber, and a liquid having solids of suspension therein in said chamber for the purpose set forth.

4. The process of preventing leakage along a rod, consisting in introducing a liquid containing solids of suspension into a chamber in the rear of the packing, which is to prevent the said leakage, and causing the said liquid to filter through said packing and the said solids to filter out and prevent further leakage.

In testimony whereof I have signed my name to this specification this 11th day of April, 1919.

ARTHUR WRIGHT.